United States Patent [19]
Bryant

[11] Patent Number: 5,465,095
[45] Date of Patent: Nov. 7, 1995

[54] TIME EFFICIENT METHOD FOR PROCESSING ADAPTIVE TARGET DETECTION THRESHOLDS IN DOPPLER RADAR SYSTEMS

[75] Inventor: Steve M. Bryant, Eldersburg, Md.

[73] Assignee: The United States of America as represented by the Secretary of the Air Force, Washington, D.C.

[21] Appl. No.: 286,577

[22] Filed: Aug. 5, 1994

[51] Int. Cl.$^6$ .......................... G01S 13/534; G01S 7/292
[52] U.S. Cl. .................. 342/159; 342/91; 342/162
[58] Field of Search ......................... 342/159, 90, 91, 342/92, 93, 95, 101, 195, 162, 189, 192, 194, 160, 161, 163, 145, 110, 111, 115, 116

[56] References Cited

U.S. PATENT DOCUMENTS

| | | | |
|---|---|---|---|
| 3,720,942 | 3/1973 | Wilmot et al. | 343/7.7 |
| 3,831,174 | 8/1974 | King et al. | 342/90 |
| 3,858,208 | 12/1974 | Parke et al. | 342/88 |
| 3,995,271 | 11/1976 | Goggins, Jr. | 342/91 |
| 4,137,532 | 1/1979 | Taylor, Jr. et al. | 342/93 |
| 4,486,756 | 12/1984 | Peregrim et al. | 343/16 M |
| 4,578,676 | 3/1986 | Harrison, Jr. | 342/89 |
| 4,713,664 | 12/1987 | Taylor, Jr. | 342/91 |
| 4,742,353 | 5/1988 | D'Addio et al. | 342/159 |
| 4,816,833 | 3/1989 | Ferguson et al. | 342/95 |
| 4,845,500 | 7/1989 | Cornett et al. | 342/90 |
| 5,349,567 | 9/1994 | Reed | 367/100 |
| 5,376,940 | 12/1994 | Abatzoglou | 342/192 |

Primary Examiner—John B. Sotomayor
Attorney, Agent, or Firm—William G. Auton; Jacob N. Erlich

[57] ABSTRACT

A time efficient method for processing digitized doppler radar signals and establishing adaptive target detection thresholds which are used to distinguish targets from noise and clutter. After subdividing the range-doppler matrix into several equally-sized parallel processing elements, the radar system's signal processor executes this process on each processing element in parallel. This process involves the processing of the digitized radar signals stored in each parallel processing element by integrating over the amplitudes of each data cell in a given parallel processing element. This, in turn, yields a secondary data array for each parallel processing element equal in dimension to the parallel processing element itself. Target detection thresholds for all cells in each parallel processing element can then be established from the values stored in these secondary data arrays. This process is time efficient in that the number of signal processing steps needed to establish the target detection thresholds for each and every data cell in the range-doppler matrix is independent of the number of targets and unique noise, clutter regions in the surveillance area.

8 Claims, 8 Drawing Sheets

TIME EFFICIENT METHOD FOR PROCESSING ADAPTIVE TARGET DETECTION THRESHOLDS IN DOPPLER RADAR SYSTEMS

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to the processing of doppler radar signals, where the radar signals contain both targets and unwanted energy in the form of background noise and clutter. Specifically, the invention provides a time efficient method for processing digitized radar signals in order to determine an adaptive target detection threshold which can then be used to distinguish real targets from background noise and clutter.

2. Background Information

Adaptive target detection thresholds (herein refered to as adaptive thresholds) are an important part of any doppler radar system's signal processor. Adaptive thresholds improve the radar system's ability to identify and distinguish targets from background noise, clutter, and other forms of interference.

After receiving the radar return signal, the radar system down-converts the signal from radio frequency (RF) to intermediate frequency (IF). It then digitizes, filters, and stores the information in memory for additional signal processing. The information is stored in the form of a 2-dimensional data array commonly known as a range-doppler matrix. Each data element, also called a range-doppler cell, in the data array represents the amount of radar energy present at that specific range-doppler filter combination.

The radar system's signal processor must then compare each data element in the range-doppler matrix with an adaptive threshold value to determine if a target exists at that range-doppler frequency combination. The radar system will establish that a target exists if the value of the range-doppler cell exceeds the adaptive threshold value.

The value of the adaptive threshold level is a function of the amplitudes in the range-doppler cells surrounding the specific range-doppler cell for which the process must derive the adaptive threshold. Furthermore, the number of surrounding range-doppler cells (data points) needed to effectively compute an adaptive threshold varies with range-to-target, flight attitude, noise, clutter, and intentional interference should it exist. If the environment of the surveillance area is dynamic, the signal processor must continue to vary, or adapt, the number of data points for each unique environmental region in the range-doppler matrix, thus the term "adaptive threshold". Only then will each threshold level accurately reflect the clutter and noise environment for that particular region.

In theory, each range-doppler cell could represent a unique environmental region and require a different set of data points (parameter set) for computing its corresponding adaptive threshold. In theory, the surveillance area could be perfectly flat, with little or no clutter. In this case, the same number of data points could be used to derive the threshold levels. Typically, the environmental characteristics of the radar surveillance area is somewhere between these two extremes.

A typical adaptive threshold computation is illustrated in Equation (1).

$$\beta_{ij} = \gamma_{ij} \left\{ \left( \sum_{k=i-n}^{i+n} \sum_{l=j-m}^{j+m} \alpha_{kl} \right) - \left( \sum_{g=i-p}^{i+p} \sum_{h=j-q}^{j+q} \alpha_{gh} \right) \right\} \quad (1)$$

$\alpha_{kl}$ represents the amplitude of the klth cell surrounding the ijth cell for which the threshold value ($B_{ij}$) is being determined. $\alpha_{gh}$ represents the amplitude of a smaller area immediately surrounding the ijth cell which must be subtracted from the amplitudes of the other cells to prevent the target, if one exists, from self-biasing the average amplitude upon which the threshold is based. $\gamma_{ij}$ represents a scaling multiplier.

The range-doppler matrix is typically divided, for signal processing purposes, into several equally sized subarrays called parallel processing elements. For example, if the range-doppler matrix contains 64 range range gates and 128 doppler filters (8,192 range-doppler cells), the signal processor might divide the matrix into 16 equally sized processing elements, each being 64 range gates by 8 doppler filters (512 range-doppler cells).

Conventional doppler radar systems typically employ what is known as Single Instruction path, Multiple Data path (SIMD) signal processor architecture. This type of signal processing architecture typically assumes an equal distribution of data over a set of parallel processing elements when executing arithmetic operations on an identical instruction stream. When this assumption is true, the typical SIMD signal processing architecture implementation can effectively and efficiently compute adaptive thresholds for the entire range-doppler matrix. When the assumption is not true, in other words, as the data distribution across the parallel processing elements becomes less and less uniform due to variations in the surveillance area environment, the conventional SIMD processor becomes less and less effective.

As stated above, the range-doppler matrix typically reflects radar signal returns over a large surveillance area containing many environmental variations. In order to optimize target detection performance, the radar system's signal processor must be able to apply as many unique parameter sets as necessary to derive adaptive thresholds which accurately reflect each unique environmental region in the range-doppler matrix. The conventional SIMD processor must process each unique parameter set in sequence. Since each sequential operation increases the overall amount of time required to process the data stored in the range-doppler matrix, the signal processor may not have enough time to derive an adaptive threshold for each unique environmental region. The result with conventional radar processing systems to date has been to minimize the number of parameter sets used in order to save valuable processing time. The "trade-off" is that the system may be forced to apply less than optimal parameter sets; therefore, less than optimal adaptive thresholds. This ultimately degrades target detection performance.

The concept of target detection thresholds is not itself unique as is evident in the following U.S. Patents, the disclosures of which are incorporated herein by reference:

U.S. Pat. No. 4,845,500 issued to Cornett et al;
U.S. Pat. No. 4,713,664 issued to Taylor, Jr.;
U.S. Pat. No. 4,486,756 issued to Peregrim et al; and
U.S. Pat. No. 3,720,942 issued to Wilmot et al.

Cornett et al disclose a radar video detector and target tracker in which an adaptive target detection threshold value is calculated for each target on every scan. The threshold values are computed by taking the radar video signals from a target or clutter and averaging the signals over small areas (cells) which are stored in memory for processing. These cells are elements in a matrix 'n' azimuth sectors and 'm' range bins in dimension. Stored values in the first and last row of cells are processed to establish the mean value and mean deviation value for each row in the window. The smallest values are subtracted from the averaged signals to establish a new stored amplitude for each cell with reduced background noise. Each element is compared with its neighboring elements and a target detection is indicated in a cell when at least one of the two adjacent elements have positive resulting amplitudes.

The Taylor, Jr. patent relates to an adaptive threshold system which is used to set the alarm threshold level for doppler filters. The system uses data corresponding to at least three antenna azimuth positions. The data is derived from adjacent coherent processing intervals in moving target detector (MTD) radar systems. The adaptive threshold level is governed by combinations of three or more azimuth data values in order to make the threshold level more closely match the residue curve rather than the input clutter from a point clutter source. Compensation of the threshold level determined from the three azimuth data values is provided by signals from the zero doppler filter output. Additional compensation is provided for other system variables, such as changes in the scan rate, radar instability, and conventional constant false alarm rate processing. The threshold system combines the largest of the clutter input values with the compensating signals by use of a log power combiner to provide the combined and compensated threshold level.

Peregrim et al describes a method of reducing angle noise in a missile radar. Energy is transmitted in an arbitrarily chosen frequency pair symmetrically disposed about the tuning frequency of the radome of a radar, and the complex monopulse ratios of the return signals are formed. The sum magnitude and the magnitude of the imaginary part of the complex monopulse ratio, determined for each frequency pair, are subjected to selected thresholds in order to reject erroneous data points. A sum channel threshold and a threshold on the imaginary part of the complex monopulse ratios are utilized. Both of these thresholds vary as a function of the missile-to-target range. In addition, a glint threshold is also utilized. The glint threshold is an adaptive threshold predicated on a desired probability of false alarm.

Wilmot et al relates to a system for automatically processing quantized normal and moving target indicator (MTI) radar video to provide improved clutter rejection and improved detection of moving targets in clutter. The quantized video is applied to a mean level detector. The sensitivity of the mean level detector is controlled as a function of the number of detected target reports being stored in an output buffer unit in order to provide the proper threshold. The output of the mean level detector and the quantized normal video are applied to a video selector circuit for automatic selection of subsequent detection and processing.

Although these patents relate to various methods for processing radar signals and enhancing target detection, they do not describe an efficient process for computing a generalized adaptive target detection threshold, where the process for establishing the threshold is independent of complexity of the noise and clutter environment surrounding each and every target in a given surveillance area.

SUMMARY OF THE INVENTION

The present invention overcomes the problems encountered in the conventional doppler radar, SIMD signal processing approach as set forth in detail hereinabove by establishing a process for deriving adaptive target detection thresholds that is independent of the number of unique target, clutter, noise regions present in the 2-dimensional range-doppler data distribution.

It is one object of this invention to establish a process that minimizes the processing time required to compute adaptive target detection thresholds when employing typical SIMD signal processing architecture.

It is another object of this invention to establish a process in which the number of sequential operations required to derive the adaptive threshold for each range-doppler cell in the processing element is independent of the number of unique environmental regions in the radar surveillance area.

It is still a further object of this invention to establish a process that improves target detection performance by applying a unique target detection threshold value for each and every unique environmental region present in a range-doppler matrix.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

Figure 1:
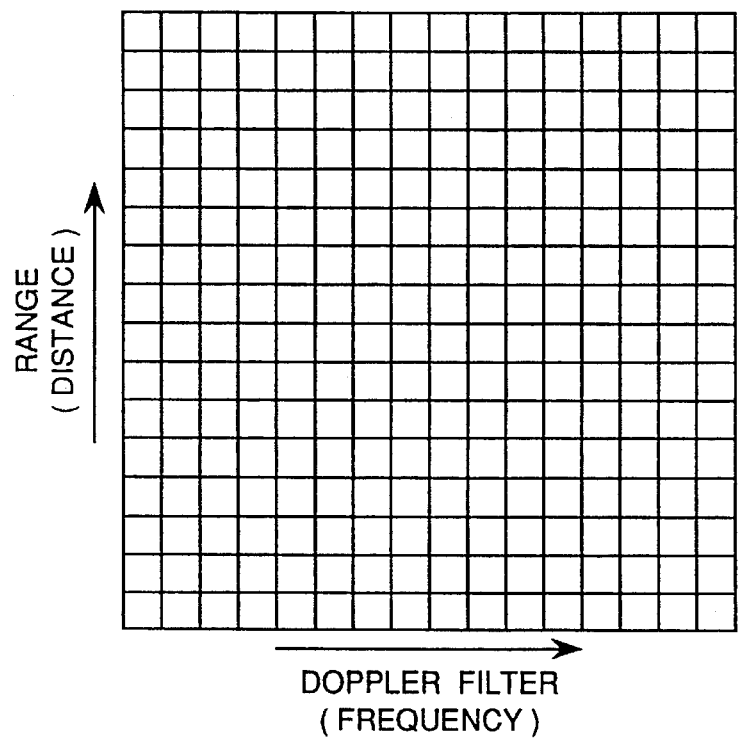
FIG. 1 is a graphical illustration of a typical 2-dimensional range-doppler matrix where each range-doppler cell represents radar return signal energy at a given range and dopper frequency.
Figure 2:
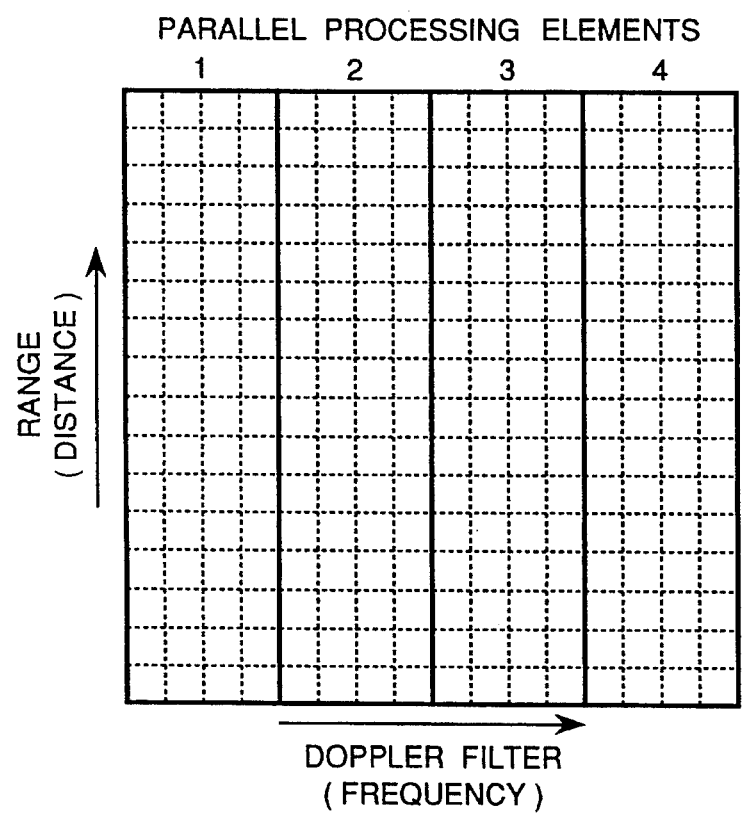
FIG. 2 is a graphical illustration of a typical 2-dimensional range-doppler matrix divided into four parallel processing elements; a typical range-doppler matrix might have 60 or more range gates and 128 doppler filters divided into 16 equally sized parallel processing elements.

The signal processing described by this invention can best be described in a five step approach. Before describing these five steps, it is necessary to set forth a few assumptions upon which the following description is based. First, when utilized in conjunction with a doppler radar system, the radar data containing target, clutter, and noise information is already stored in the form of a 2-dimensional data array known as a range-doppler matrix, as shown in FIG. 1 of the drawings. Second, the range-doppler matrix is divided, for signal processing purposes, into several equally sized parallel processing elements, each containing all range gates over a subset of doppler filters, as shown in FIG. 2 of the drawings. This distribution of the data is not required, but is typical following a corner-turn Fourier Transform operation. It is possible for each parallel processing element to contain all the doppler filters over a subset of range gates. Third, some data shuffling or use of data from range-doppler cells in adjacent processing elements is necessary to compute the adaptive thresholds for range-doppler cells near or bordering two adjacent processing elements. Finally, the radar system signal prcessor is presumed to employ conventional Single Instruction path, Multiple Data path (SIMD) architecture. With A SIMD signal processor, the process described below will be executed sequentially for each parallel processing element. However, the SIMD processor will simultaneously execute the same process for all of the other parallel processing elements.

The first step in the process defined by the invention involves integrating each radar signal level in the given parallel processing element. This step is accomplished by integrating the amplitudes of each range-doppler cell in accordance with Equation 2.

$$\theta_{uv} = \sum_{k=s}^{u} \sum_{l=0}^{v} \alpha_{kl} \ (u=0,\ldots,r-1; v-s,\ldots,s+d) \quad (2)$$

In equation (2), $\alpha_{kl}$ represents the amplitude of the kith range-doppler cell in the processing element, which in turn reflects the digitized value of the actual radar signal level at range "k" and doppler frequency "l"; "r" represents the number of range gates per doppler filter; "d" represents the total number of doppler filters in the processing element; $\theta_{uv}$ represents the resulting matrix after integrating the amplitudes for each range-doppler cell in the parallel processing element.

Figure 3:
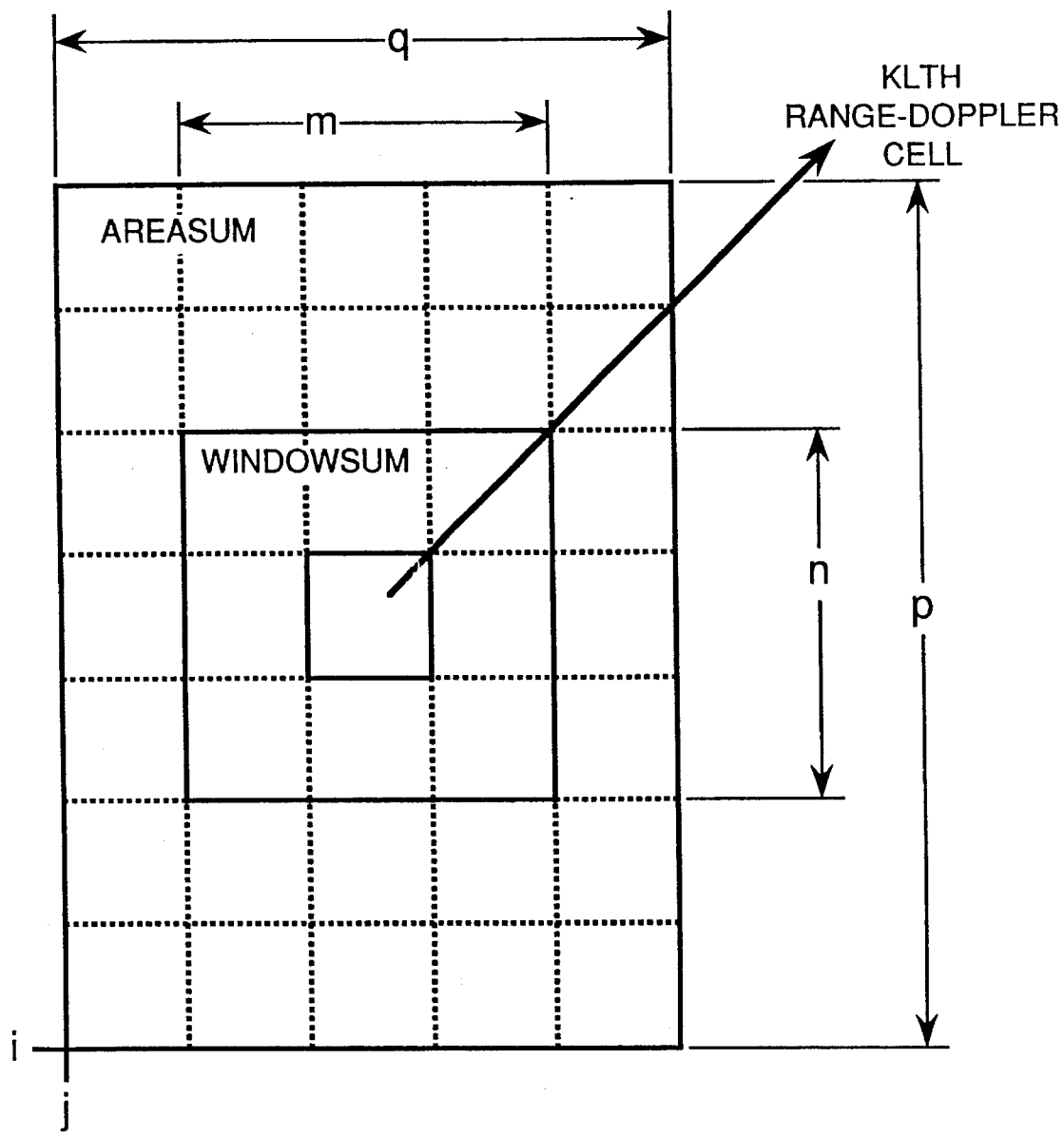
FIG. 3 is an illustration representing the physical relationship between the 'areasum', $\psi_{ij}$, 'p' range gates by 'q' doppler filters, the 'windowsum', $\Xi_{ij}$, 'm' range gates by 'n' doppler filters, and the klth range-doppler cell for which the process must establish an adaptive threshold.
Figure 4:
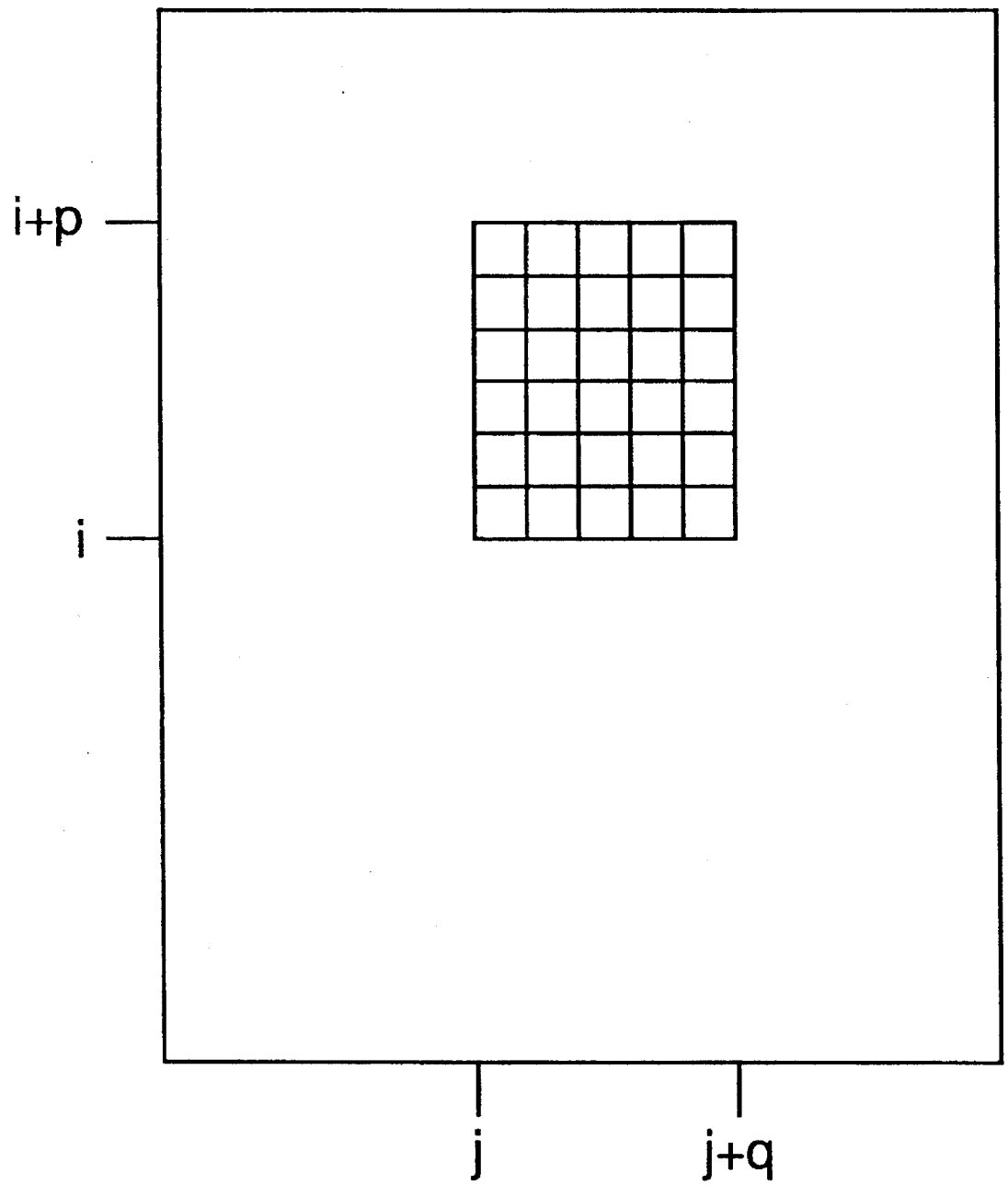
FIGS. 4–9 are a series of diagrams graphically illustrating the 'areasum', $\psi_{ij}$, derivation.
Figure 5:
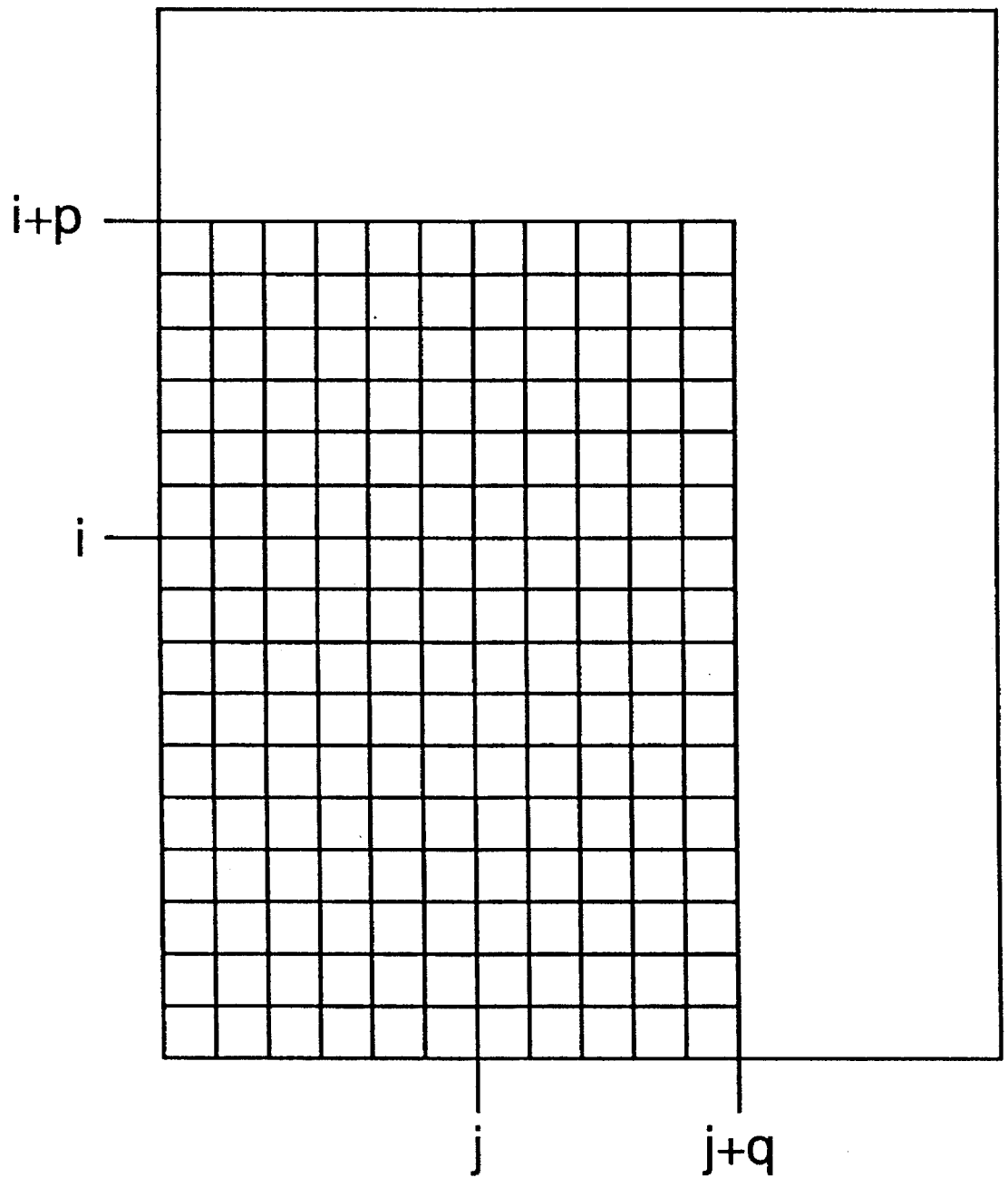
Figure 6:
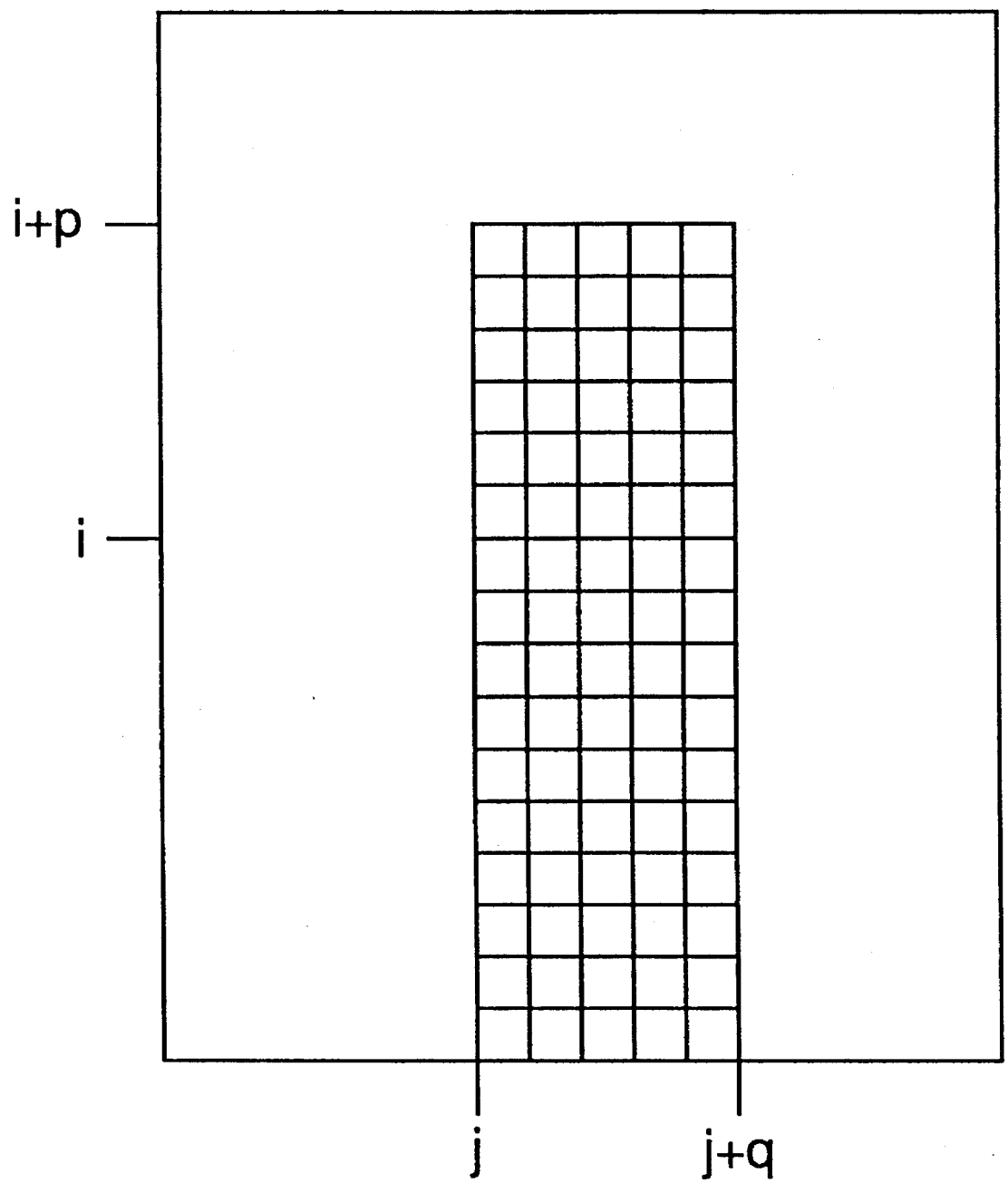
Figure 7:
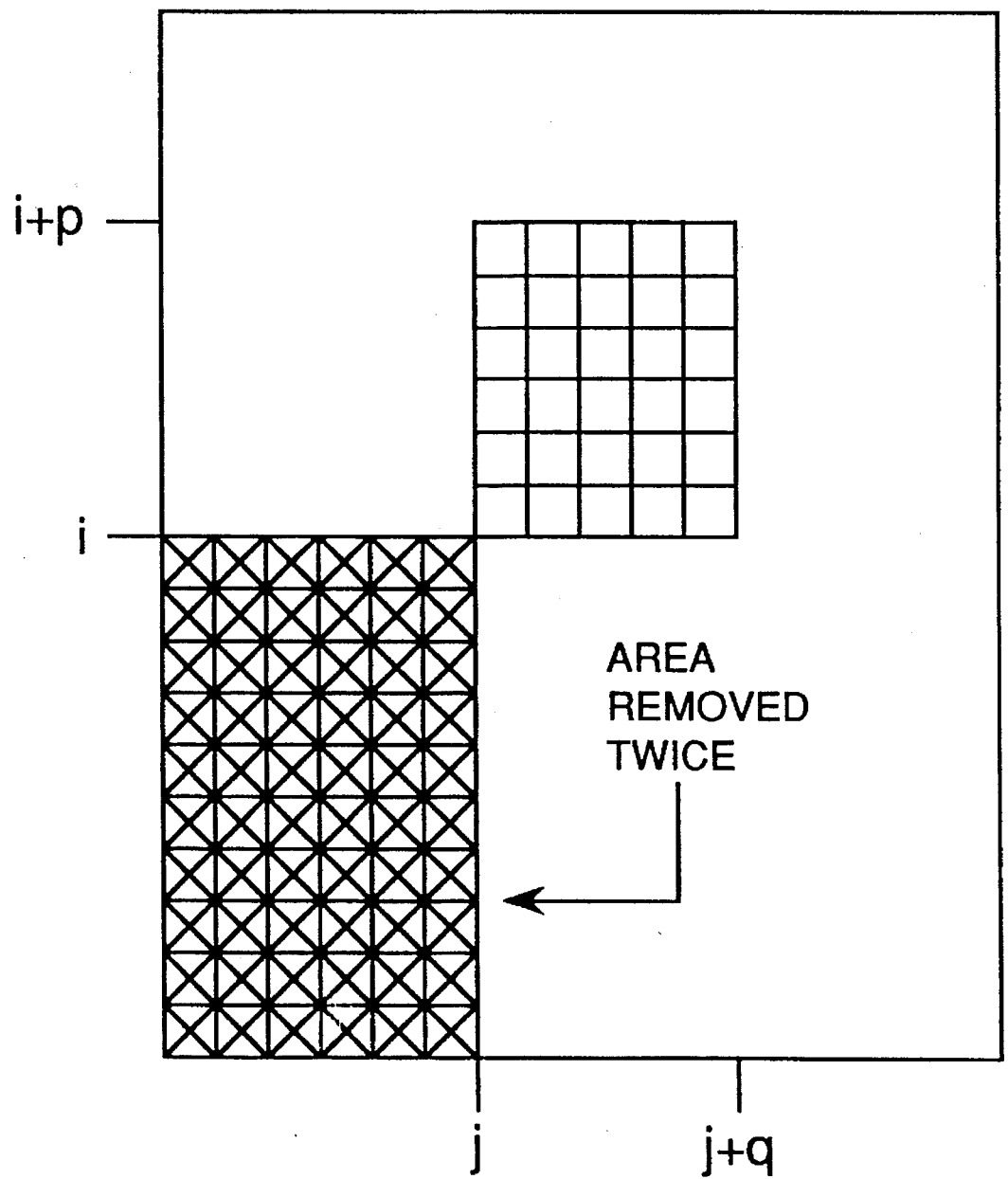
Figure 8:
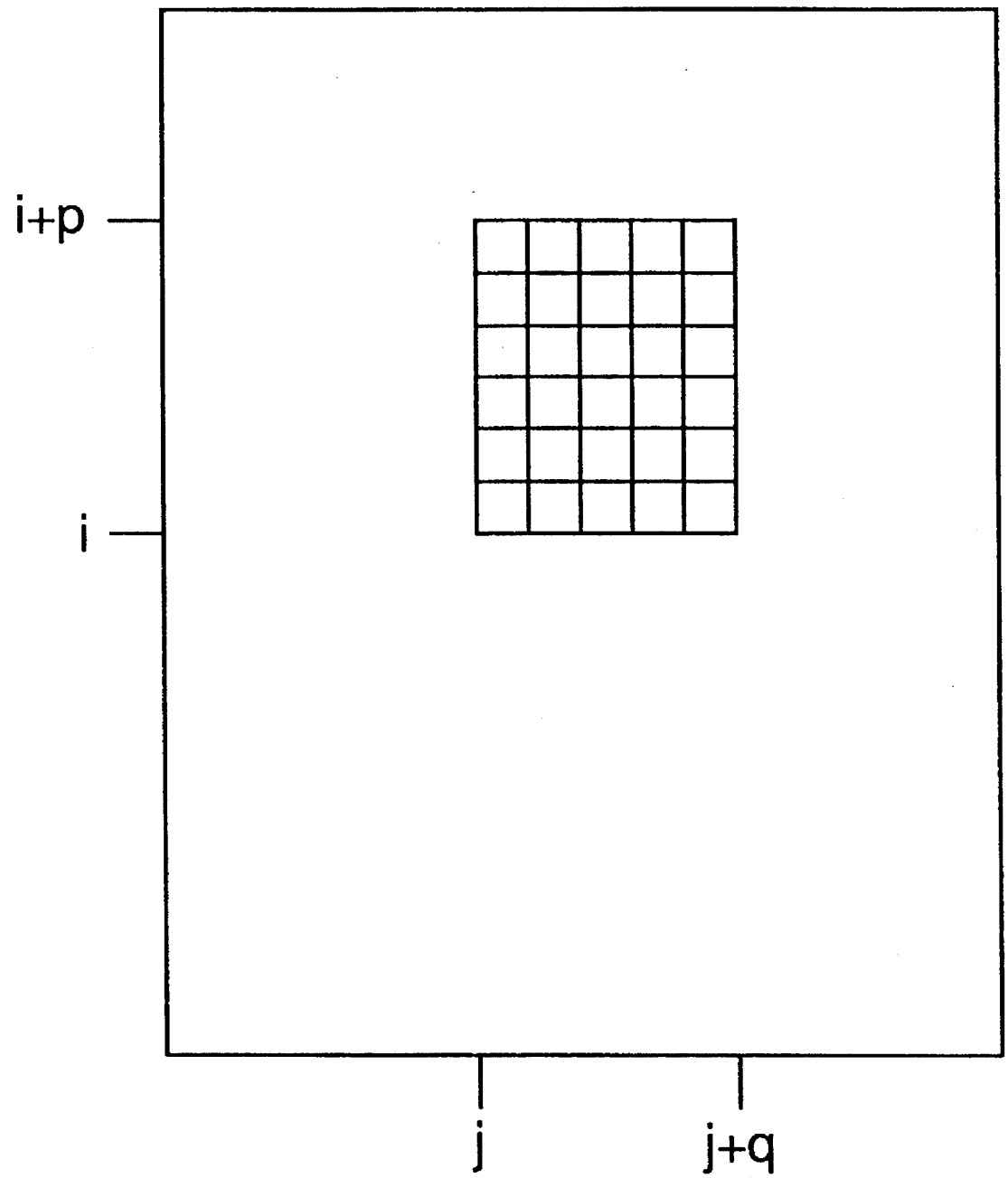
Figure 9:
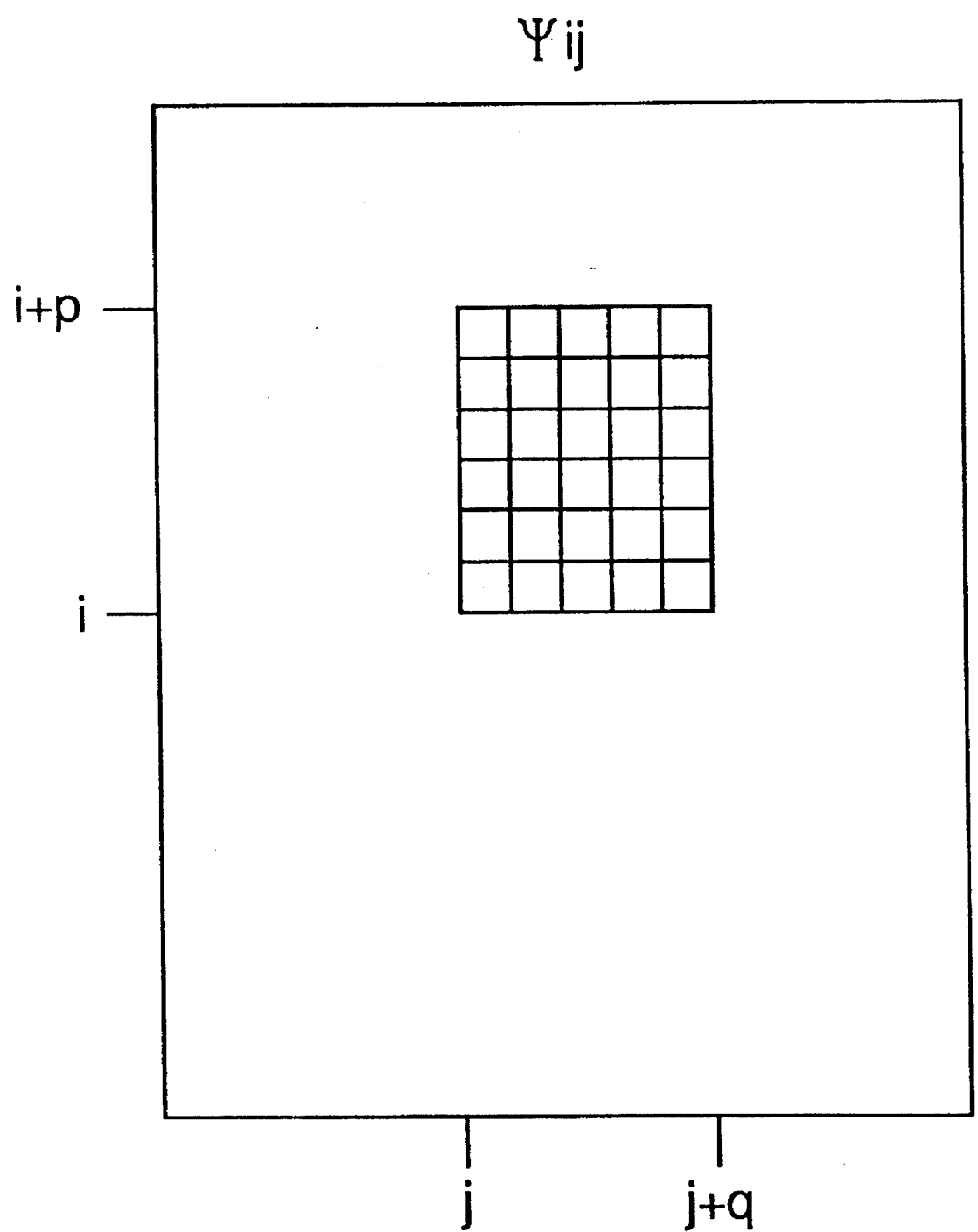

The second step in the process defined by the invention involves isolating and characterizing the target, clutter, and noise environment of the range-doppler space for which the process must derive a target detection threshold. This step is accomplished by aggregating the radar signal returns immediately in and around said range-doppler space. For the purpose of this invention, we call the aggregation of these radar signals the 'areasum', $\psi_{ij}$. With respect to the radar system signal processor, the areasum, $\psi_{ij}$, represents the summation of amplitudes from several range-doppler cells occupying a rectangular space around and including the range-doppler cell for which the process must establish an adaptive target threshold. The dimensions of areasum, $\psi_{ij}$, are predetermined based on the specific characteristics of the corresponding target, clutter, and noise environment as shown in FIGS. 3 and 4. For illustrative purposes, the dimensions 'p' and 'q', as shown in FIGS. 3 and 4, will increase or decrease so as to accurately reflect the environmental characteristics for each unique range-doppler combination. Equation (3) represents the numerical manipulation necessary to complete step two while FIGS. 5 through 9 graphically illustrate the same procedure.

$$\psi_{ij} = \theta_{i+p, j+q} - \theta_{i+p, j} - \theta_{i,j+q} + \theta_{ij} \quad (3)$$

The third step in this process defined by the invention involves isolating and quantifying radar signal energy that is the result of an actual target, if one exists, in the range-doppler space for which the process must establish a target threshold. For the purpose of this invention, we call this quantity the 'windowsum' $\Xi_{ij}$. With respect to the radar system signal processor, windowsum, $\Xi_{ij}$, represents the summation of one or more range-doppler cells occupying a small rectangular area located within the larger rectangular area defined above as the areasum. The dimensions of the windowsum are predetermined and based primarily on the physical characteristics of the anticipated target(s), if one exists at all. If, for illustrative purposes, the dimensions of the rectangular area associated with the windowsum are 'n' doppler filters long by 'm' range gates wide, 'n' must be greater than or equal to 1 but less than 'q' and 'm' must be greater than or equal to 1 but less than 'p', as shown in FIG. 3. In the extreme case where 'm' and 'n' are both equal to 1, the windowsum represents the amplitude of the single range-doppler cell for which the process defined by this invention must establish a target detection threshold. Equation (4) represents the numerical manipulation necessary to complete step three. The values for $\theta_{uv}$ needed to derive both the areasum as defined above and the windowsum as defined below have been stored in memory as a result of completing step one described above.

$$\Xi_{ij} = \theta_{i+m, j+n} - \theta_{i+m, j} - \theta_{i,j+n} + \theta_{ij} \quad (4)$$

The fourth step in the process defined by this invention involves the derivation of a radar signal threshold against which the signal processor will eventually compare the actual radar energy level from a given range-doppler cell in order to determine whether or not a real target exists at that range-doppler combination. For the purpose of this invention, we call this signal threshold the adaptive target threshold, $\beta_{ij}$. To complete this step, the signal processor must first take the quantity which represents the target, clutter, and noise characteristic of the target area and remove any biasing effect due to the target itself. The signal processor accomplishes this by subtracting the windowsum, derived in step three, from the areasum, derived in step two. The signal processor must then normalize the resulting quantity so the adaptive threshold, $\beta_{ij}$, reflects the average background noise and clutter level for that specific range-doppler cell in the range-doppler matrix. Equation (5) represents the numerical manipulation necessary to complete step three, where $\gamma_{ij}$ represents the normalizing factor described above.

$$\beta_{ij} = \gamma_{ij}(\psi_{ij} - \Xi_{ij}) \quad (5)$$

The fifth step in the process defined by the invention involves repeating steps one through four, as defined above, for each range-doppler cell in the parallel processing element. For each unique environmental region in the parallel processing element, the dimensions of the areasum (p,q) and windowsum (m,n) will change, but no matter how many unique environmental regions exist, the number of sequential operations required to derive the adaptive threshold for each range-doppler cell in the processing element remains the same.

Although this invention is intended to directly apply to doppler radar systems, it is also applicable to any other signal processing application involving the processing of data stored in 2-dimensional arrays and where signals of interest must be identified and distinguished from clutter, noise, or other background interference. Image processing is a good example of a related application.

What is claimed is:

1. A process applicable to doppler radar systems that can produce a unique target detection threshold for every cell in a two-dimensional data array, herein referred to as a range-doppler matrix, which is completely independent of the number of unique target, clutter, noise regions in a surveillance area associated with said range-doppler matrix, said process comprising the steps of:

a. digitizing and storing radar signal returns in memory in the form of said range-doppler matrix, 'r' range gates long and 'd' doppler filters wide, wherein each data element in said range-doppler matrix is herein referred to as a range-doppler cell, wherein said range-doppler matrix is divided, for Single Instruction, Multiple Data (SIMD) signal processing purposes, into several, equally sized parallel processing elements;

b. integrating said radar signal amplitudes for each range-doppler cell in a given parallel processing element resulting in a secondary, two-dimensional data array, $\theta_{uv}$;

c. establishing a quantity, herein referred to as an 'areasum', which is a function of targets, if any exist, background noise, and clutter in a region surrounding and including said range-doppler cell for which said process must determine said adaptive target detection threshold;

d. establishing a quantity, herein referred to as a 'windowsum', which is primarily a function of said target's characteristics, if one exists, in said range-doppler cell for which said process must determine said adaptive target detection threshold;

e. establishing said adaptive target detection threshold for said range-doppler cell by removing any signal bias, represented by the value of said windowsum, from said areasum, then averaging that result with a normalizing factor.

2. A process as defined in claim 1, wherein 'u' ranges in value from 0 to r−1 and 'v' ranges in value from 's' to 's+d', wherein 's' is the first doppler filter in said parallel processing element and 'd' is the total number of doppler filters per parallel processing element.

3. A process as defined in claim 1, wherein said areasum is established by aggregating said radar signal amplitudes from several range-doppler cells that physically occupy a rectangular space that surrounds and includes said range-doppler cell for which said process must determine said target detection threshold; this, in turn, is accomplished by combining data elements from said secondary, two-dimensional data array, $\theta_{uv}$.

4. A process as defined in claim 1, wherein said rectangular area associated with said areasum is 'p' range gates long and 'q' doppler filters wide, wherein 'p' and 'q' are predetermined values based on said target, noise, and clutter region surrounding said range-doppler cell for which said process must determine said target detection threshold, wherein 'p' is significantly less than 'r', the number of range gates in said parallel processing element and 'q' is significantly less than 'd', the number of doppler filters in said parallel processing element.

5. A process as defined in claim 1, wherein said windowsum is established by assigning to it a value equivalent to said radar signal amplitude from said range-doppler cell for which said process must determine said target detection threshold or by aggregating a small number of radar signal amplitudes from one or more range-doppler cells physically occupying a small rectangular space immediately surrounding and including said range-doppler cell for which said process must determine said target detection threshold; this, in turn, is accomplished by combining the appropriate data elements from said secondary, two-dimensional data array, $\theta_{uv}$.

6. A process as defined in claim 1, wherein said rectangular area associated with said windowsum is 'm' range gates long and 'n' doppler filters wide, wherein 'm' and 'n' are predetermined values based on anticipated target characteristics, wherein 'm' is greater than or equal to 1 but less than 'p', the number of range gates needed to accurately establish said areasum and 'n' is greater than or equal to 1 but less than 'q', the number of doppler filters needed to accurately establish said areasum.

7. A process as defined in claim 1, wherein steps b–e are repeated for each range-doppler cell in said processing element.

8. A process as defined in claim 1, wherein steps b–e are simultaneously executed by said SIMD signal processor for each of said parallel processing elements.

* * * * *